(12) United States Patent
Hollemann et al.

(10) Patent No.: US 12,725,996 B2
(45) Date of Patent: Sep. 1, 2026

(54) INTRACAVITY FREQUENCY CONVERSION IN SOLID-STATE LASER RESONATOR WITH END-PUMPING

(71) Applicant: Coherent LaserSystems GmbH & Co. KG, Göttingen (DE)

(72) Inventors: Guenter Hollemann, Lübeck (DE); Christian Hagemann, Pogeez (DE); Hannes Winter, Hamburg (DE)

(73) Assignee: Coherent LaserSystems GmbH & Co. KG, Göttingen (DE)

( * ) Notice: Subject to any disclaimer, the term of this patent is extended or adjusted under 35 U.S.C. 154(b) by 667 days.

(21) Appl. No.: 18/299,459

(22) Filed: Apr. 12, 2023

(65) Prior Publication Data

US 2023/0344190 A1 Oct. 26, 2023

Related U.S. Application Data

(60) Provisional application No. 63/332,983, filed on Apr. 20, 2022.

(51) Int. Cl.
*H01S 3/109* (2006.01)
*H01S 3/08* (2023.01)
(Continued)

(52) U.S. Cl.
CPC .......... *H01S 3/109* (2013.01); *H01S 3/08072* (2013.01); *H01S 3/083* (2013.01);
(Continued)

(58) Field of Classification Search
CPC ........ H01S 3/1312; H01S 3/108; H01S 3/109; H01S 3/094038; H01S 3/08072; H01S 3/136
See application file for complete search history.

(56) References Cited

U.S. PATENT DOCUMENTS 7,173,956 B2 2/2007 Palese et al.
2006/0072635 A1 4/2006 Wang
(Continued)

FOREIGN PATENT DOCUMENTS

CN 1983744 B 10/2012
CN 114122880 A 3/2022
WO WO-2014012847 A1 * 1/2014 ......... B23K 26/0613

OTHER PUBLICATIONS

International Search Report and Written Opinion received for International Patent Application No. PCT/EP2023/059912 mailed on Oct. 4, 2023, 20 pages.
(Continued)

*Primary Examiner* — James A Menefee
(74) *Attorney, Agent, or Firm* — TraskBritt

(57) ABSTRACT

A method for intracavity frequency conversion includes end-pumping a solid-state gain medium in a laser resonator with a pump laser beam to generate an intracavity laser beam circulating in the laser resonator, and frequency-converting a portion of the intracavity laser beam in a nonlinear crystal, located in the laser resonator, to generate a frequency-converted laser beam. The method controls the output power and at least one output beam parameter of the frequency-converted laser beam by adjusting (a) the pump power and (b) a resonator loss imposed on the intracavity laser beam. Taking advantage of both the pump laser beam and the intracavity laser beam contributing to thermal lensing in the gain medium, this control scheme is capable of controlling the output power and the output beam parameter(s) independently of each other.

19 Claims, 7 Drawing Sheets

(51) Int. Cl.
*H01S 3/083* (2006.01)
*H01S 3/094* (2006.01)
*H01S 3/108* (2006.01)
*H01S 3/131* (2006.01)
*H01S 3/136* (2006.01)

(52) U.S. Cl.
CPC ........ *H01S 3/094038* (2013.01); *H01S 3/108* (2013.01); *H01S 3/1312* (2013.01); *H01S 3/136* (2013.01)

(56) References Cited

U.S. PATENT DOCUMENTS

2006/0227819 A1* 10/2006 Irikuchi ................ H01S 3/1312 372/19
2008/0259969 A1* 10/2008 Piper ..................... H01S 3/1086 372/20
2010/0002732 A1* 1/2010 Tidemand-Lichtenberg .............. H01S 3/115 372/12
2017/0373463 A1 12/2017 Narumi et al.
2019/0089119 A1 3/2019 Lu et al.

OTHER PUBLICATIONS

Floess et al., (2022). "Femtosecond tunable light source with variable repetition rate between 640 kHz and 41MHz with a 130 dB temporal pulse contrast ratio," Optics Express, 30(1):1-11.

* cited by examiner

LASER
180
184
194
912
192
910
GAIN MEDIUM
920
NLC
130
196
PUMP LASER
160
190
940
932
λ/2
930
B
934
998
CONTROLLER
170
SENSOR(S)
172
182
900

INTRACAVITY FREQUENCY CONVERSION IN SOLID-STATE LASER RESONATOR WITH END-PUMPING

CROSS-REFERENCE TO RELATED APPLICATIONS

This application claims the benefit of U.S. Provisional Application No. 63/332,983, filed Apr. 20, 2022, the entire contents of which is incorporated herein by reference.

TECHNICAL FIELD

The present invention relates to the intracavity frequency conversion of laser radiation in an end-pumped solid-state laser resonator. The present invention relates in particular to controlling power and beam parameters of the intracavity laser radiation, and thereby the power and beam parameters of the frequency-converted laser radiation, in the presence of thermal lensing in the laser gain medium.

BACKGROUND

The gain medium of a solid-state laser or laser amplifier is a solid host-material doped with optically-active ions capable of generating or amplifying laser radiation when excited. The host material is generally glassy or crystalline, and the optically-active ions are typically rare earth or transition metal ions, such as neodymium, erbium, ytterbium, or titanium. The gain medium may be in the form of a bulk crystal/glass or an optical fiber. Most bulk gain media are shaped as a rod or a slab. As compared to gas lasers, solid-state lasers have many advantages, including operational simplicity, efficiency, reliability, compactness, and lower cost.

Commonly, solid-state laser gain media are optically pumped, that is, the optically-active ions are optically excited to provide the needed population inversion for lasing action. Most solid-state laser gain media are pumped by a laser beam. Diode lasers are a particularly popular choice for the pump laser source due to their many advantages, e.g., efficiency, compactness, long lifetime, and low cost. Some systems utilize arrays of laser diodes to provide the needed pump power, as high as hundreds of watts or even kilowatts.

In the case of laser-pumped bulk gain media, several different pump geometries are possible. In end-pumping, the pump laser radiation is co-propagating or counter-propagating with the intracavity laser radiation generated in the bulk gain medium and circulating in the laser resonator. Side-pumping entails directing the pump laser radiation into the gain medium through a face that is parallel to the propagation direction of the output laser beam, such that the propagation direction of the pump laser radiation is generally perpendicular to that of the intracavity laser radiation.

End-pumping allows for a good spatial overlap between the pump laser radiation and the intracavity laser radiation, and minimizes pump energy lost to portions of the bulk gain medium not participating in lasing action, thereby resulting in greater laser gain. End-pumping is also an advantageous geometry for thermal management as the side surfaces of the bulk gain medium may be in contact with a cooling element without interfering with the propagation paths of either one of the pump laser radiation and the output laser radiation. At high pump powers, however, end-pumping generates a thermal lens in the bulk gain medium in the path of the laser radiation. The thermal lens is primarily due to the thermo-optic effect, which is the temperature dependence of the refractive index of the gain medium, as well as thermal expansion of the gain medium. The optical design of the laser resonator can be optimized to accommodate a thermal lens of a given magnitude.

While many different wavelengths of laser radiation may be generated by solid-state lasers, frequency conversion of the initially generated laser radiation may be necessary to reach certain wavelengths, particularly in the ultraviolet (UV) spectral range. A laser beam may undergo frequency conversion in a nonlinear crystal through harmonic generation, sum-frequency mixing, or difference-frequency mixing. In intracavity frequency conversion, the nonlinear crystal is placed inside the laser resonator used to generate the laser beam to be frequency converted. Intracavity frequency conversion benefits from the high power of the intracavity laser beam circulating in the laser resonator.

Any given laser application has certain requirements for laser power and laser beam parameters. Typically, the beam parameters specified are (a) beam waist size, (b) beam waist location, and (c) beam divergence angle or beam quality factor $M^2$. The power and beam parameter specifications can be very strict. Some laser applications rely on the laser power being adjustable, sometimes in conjunction with adhering to tight specifications of beam parameters. While it may be possible to adjust the output power of a laser apparatus by adjusting aspects of its internal operation, such adjustment often has other consequences as well. For example, the output power of a laser apparatus based on a solid-state laser resonator with end-pumping may be adjusted by adjusting the pump laser power. However, when the pump-induced thermal lens is non-negligible, the beam parameters of the intracavity laser beam are affected as well, since the thermal lens makes the gain medium an element in the laser resonator having optical power. To avoid such issues, laser power adjustment is often accomplished by simply attenuating the output laser beam using, for example, an acousto-optic modulator (AOM) or an electro-optic modulator (EOM).

BRIEF SUMMARY

Disclosed herein is an advantageous scheme for controlling power and beam parameters of the frequency-converted output laser beam of a solid-state laser resonator with end-pumping and intracavity frequency conversion. The present control scheme is applicable to scenarios with non-negligible thermal lensing in the solid-state gain medium. The control scheme is based on our discovery that independent adjustment of the pump power and the resonator loss facilitates independent control of the power and beam parameters of the intracavity laser beam over wide power and beam parameter ranges. This is a result of both the pump laser beam and the intracavity laser beam contributing to thermal lensing in the laser gain medium. Independent control of the power and beam parameters of the intracavity laser beam amounts to independent control of the power and beam parameters of the frequency-converted laser beam. In a less-capable control scheme based on adjustment of only one of the pump power and the resonator loss, the beam parameters of the intracavity laser beam would be directly coupled to its power, and this coupling would at least to some extent transfer to the frequency-converted laser beam. The present control scheme does not require an AOM or EOM for attenuation of the frequency-converted laser beam. Especially when the frequency-converted laser beam is ultraviolet, such a modulator would be costly and could itself further modify the beam parameters.

The present control scheme adds versatility and control to laser apparatuses based on a solid-state laser resonator with end-pumping and intracavity frequency conversion. With this control scheme, power and beam parameters of the frequency-converted laser beam may be tailored to meet a range of specifications with no need for hardware reconfigurations. Active stabilization of pump power and/or resonator loss may be employed to maintain required power and beam parameters in the presence of environmental changes, UV degradation of optical elements, and other sources of noise, fluctuations, and drift. The control scheme may also be used to change the power and/or beam parameters of the frequency-converted laser beam during a process. For example, the frequency-converted laser power may be ramped up or down (within a certain range) while maintaining the same beam parameters.

In one aspect, a method for intracavity frequency conversion includes steps of (a) end-pumping a solid-state gain medium in a laser resonator with a pump laser beam, having a pump power, to generate an intracavity laser beam circulating in the laser resonator, (b) imposing a loss on the intracavity laser beam, (c) frequency-converting a portion of the intracavity laser beam in a nonlinear crystal located in the laser resonator, to generate a frequency-converted laser beam having an output power, and (d) adjusting the pump power and the loss to control the output power and at least one output beam parameter of the frequency-converted laser beam. The at least one output beam parameter is selected from the group consisting of beam waist size, beam waist location, beam divergence angle, and beam quality factor.

In another aspect, a laser apparatus with intracavity frequency conversion includes a laser resonator having a solid-state gain medium, a nonlinear crystal, and an adjustable loss element arranged to impose an adjustable loss on the laser resonator. The laser apparatus further includes a pump laser for generating a pump laser beam having a pump power. The pump laser is arranged to end-pump the gain medium so as to generate an intracavity laser beam circulating in the laser resonator. The intracavity beam undergoes partial frequency-conversion in the nonlinear crystal to generate a frequency-converted laser beam having an output power. The laser apparatus also includes one or more sensors for monitoring the output power and at least one output beam parameter of the frequency-converted laser beam, and a controller configured to control the output power and the at least one output beam parameter by adjusting the pump power and the loss according to monitored values of the output power and the at least one output beam parameter. The at least one output beam parameter is selected from the group consisting of beam waist size, beam waist location, beam divergence angle, and beam quality factor.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION

Figures 1, 2:
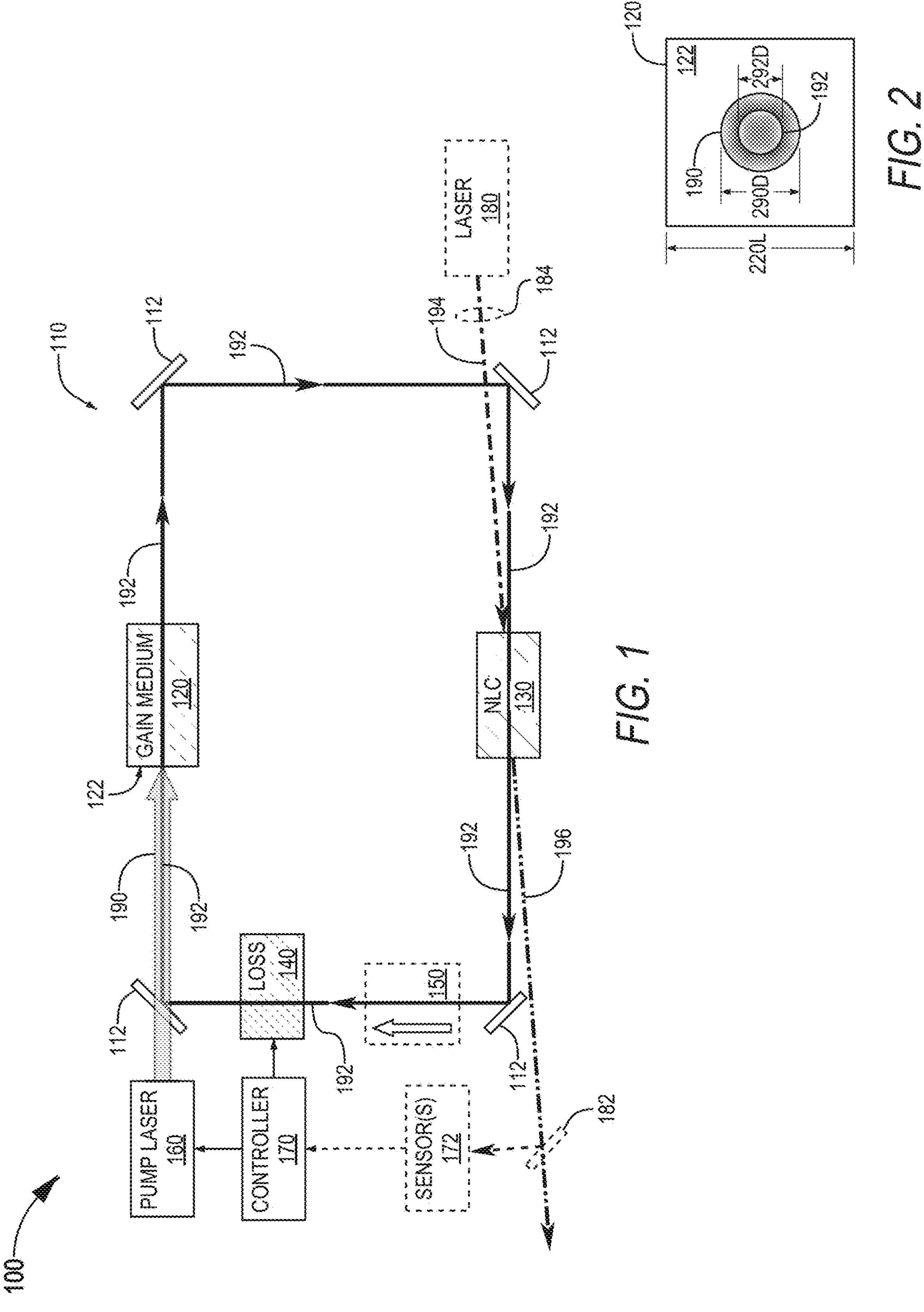
FIG. 1 illustrates a laser apparatus with intracavity frequency conversion in a solid-state laser resonator having an end-pumped solid-state gain medium, according to an embodiment.
FIG. 2 shows examples of a pump beam and an intracavity beam incident on the end face of the gain medium of the apparatus of FIG. 1.

Referring now to the drawings, wherein like components are designated by like numerals, FIG. 1 illustrates one laser apparatus 100 with intracavity frequency conversion in a solid-state laser resonator 110 having an end-pumped solid-state gain medium 120. Resonator 110 includes solid-state gain medium 120, a nonlinear crystal 130, and an adjustable loss element 140. Apparatus 100 includes resonator 110, a pump laser 160, and a controller 170. In operation, pump laser 160 generates a pump laser beam 190 that is incident on an end face 122 of gain medium 120. Pump beam 190 energizes gain medium 120 to induce laser action and thereby generate an intracavity laser beam 192 circulating in resonator 110. Intracavity beam 192 undergoes partial frequency-conversion in nonlinear crystal 130. That is, a fraction of intracavity beam 192 is converted to a different frequency in nonlinear crystal 130, leading to the generation of a frequency-converted laser beam 196. Loss element 140 imposes an adjustable loss on intracavity beam 192 in resonator 110, for example by out-coupling or absorbing a fraction of intracavity beam 192. Controller 170 sets the power of pump beam 190 and the loss imposed by loss element 140 to control the power and one or more beam parameters of intracavity beam 192 and thereby also of frequency-converted beam 196. The controlled beam parameters may include one or more of beam waist size, beam waist location, beam divergence angle, and beam quality factor.

Apparatus 100 may be configured to promote any one of several different types of frequency conversion in nonlinear crystal 130, including harmonic generation, sum-frequency mixing, and difference-frequency mixing. In embodiments of apparatus 100 configured for sum-frequency or difference-frequency mixing, intracavity beam 192 may mix with another laser beam 194 in nonlinear crystal 130 to generate frequency-converted beam 196. Such embodiments of apparatus 100 may include an external laser 180 that generates beam 194.

In the example depicted in FIG. 1, the path of intracavity beam 192 in resonator 110 is defined by four cavity mirrors 112 forming a rectangular ring-resonator. Many other layouts are possible. However, a ring-resonator layout is advantageous for intracavity frequency conversion in some scenarios at least because it is possible to restrict the propagation of intracavity laser radiation to one direction. When the intended purpose of apparatus 100 is harmonic generation in nonlinear crystal 130, unidirectional propagation through nonlinear crystal 130 ensures that the frequency-converted laser radiation generated in nonlinear crystal 130 is contained in a single laser beam, which is usually preferred. Resonator 110 may include an optical diode 150, such as a Faraday rotator and a waveplate, that ensures unidirectional propagation of intracavity beam 192 in resonator 110. When the intended purpose of apparatus 100 is sum- or difference-frequency mixing, the propagation direction of laser beam 194 ensures that the frequency-converted laser radiation generated in nonlinear crystal 130 is contained in a single laser beam, regardless of whether resonator 110 is a ring resonator or a linear standing-wave resonator. A ring resonator may however be preferred for other reasons, for example to minimize power-noise in frequency-converted beam 196.

Although not depicted in FIG. 1, resonator 110 may include a series of nonlinear crystals 130, e.g., two serially-arranged nonlinear crystals 130. In one example hereof, a first nonlinear crystal 130 converts a fraction of intracavity beam 192 to its second harmonic. This second harmonic beam then undergoes sum-frequency mixing with an unconverted fraction of intracavity beam 192 in a second nonlinear crystal 130 to generate a third harmonic of intracavity beam 192. In the following, unless stated otherwise, it is assumed for simplicity that there is only one nonlinear crystal 130 in resonator 110. However, the discussion is readily extended to embodiments with multiple nonlinear crystals 130.

Frequency-converted beam 196 may propagate at an angle to intracavity beam 192 in nonlinear crystal 130, as dictated by the phase-matching condition. Depending on the magnitude of this angle, frequency-converted beam 196 may pass by one of cavity mirrors 112 (or another optical element defining resonator 110) and thereby leave resonator 110. It is also possible to separate frequency-converted beam 196 from intracavity beam 192 by dispersion, for example using a nonlinear crystal 130 with Brewster cut input and output faces. Alternatively, apparatus 100 may include a dichroic beam splitter or another optical element (not shown in FIG. 1) that extracts frequency-converted beam 196 from resonator 110.

FIG. 2 shows pump beam 190 and intracavity beam 192 as incident on end face 122 of gain medium 120. Gain medium 120 is a bulk crystal or glass. In the example depicted, gain medium 120 is a cuboidal slab with a square end face 122. Gain medium 120 may have a different shape. For example, gain medium 120 may be a slab with an oblong end face 122, or gain medium 120 may be a rod with a circular end face 122. Intracavity beam 192 may be at least approximately Gaussian. Pump beam 190 may be approximately Gaussian, may have an approximately flat-top intensity distribution, or may have an intensity distribution therebetween. The transverse profile of pump beam 190 and/or intracavity beam 192 may be elliptical rather than circular.

Regardless of the shapes of gain medium 120, pump beam 190, and intracavity beam 192, the transverse extent 290D of pump beam 190 is preferably less than the corresponding transverse extent 220L of gain medium 120 so as not to waste pump energy. In a typical operating regime, the transverse extent 292D of intracavity beam 192 is less than transverse extent 290D of pump beam 190. Each of transverse extents 290D and 292D may represent a $1/e^2$ extent of the corresponding transverse intensity profile. In one example, transverse extent 220L of gain medium 120 is in the range between 1 and 10 millimeters, transverse extent 290D of pump beam 190 is in the range between 100 and 3000 micrometers (μm), and transverse extent 292D of intracavity beam 192 is in the range between 50 and 3000 μm or between 50% and 100% of transverse extent 290D.

Pump beam 190 causes thermal lensing in gain medium 120. The power of this thermal lens is an increasing function of the power of pump beam 190. Intracavity beam 192 also contributes to thermal lensing in gain medium 120. The resulting thermal lens, induced by the combination of pump beam 190 and intracavity beam 192, affects the beam parameters of intracavity beam 192 during its propagation through resonator 110.

Figure 3:
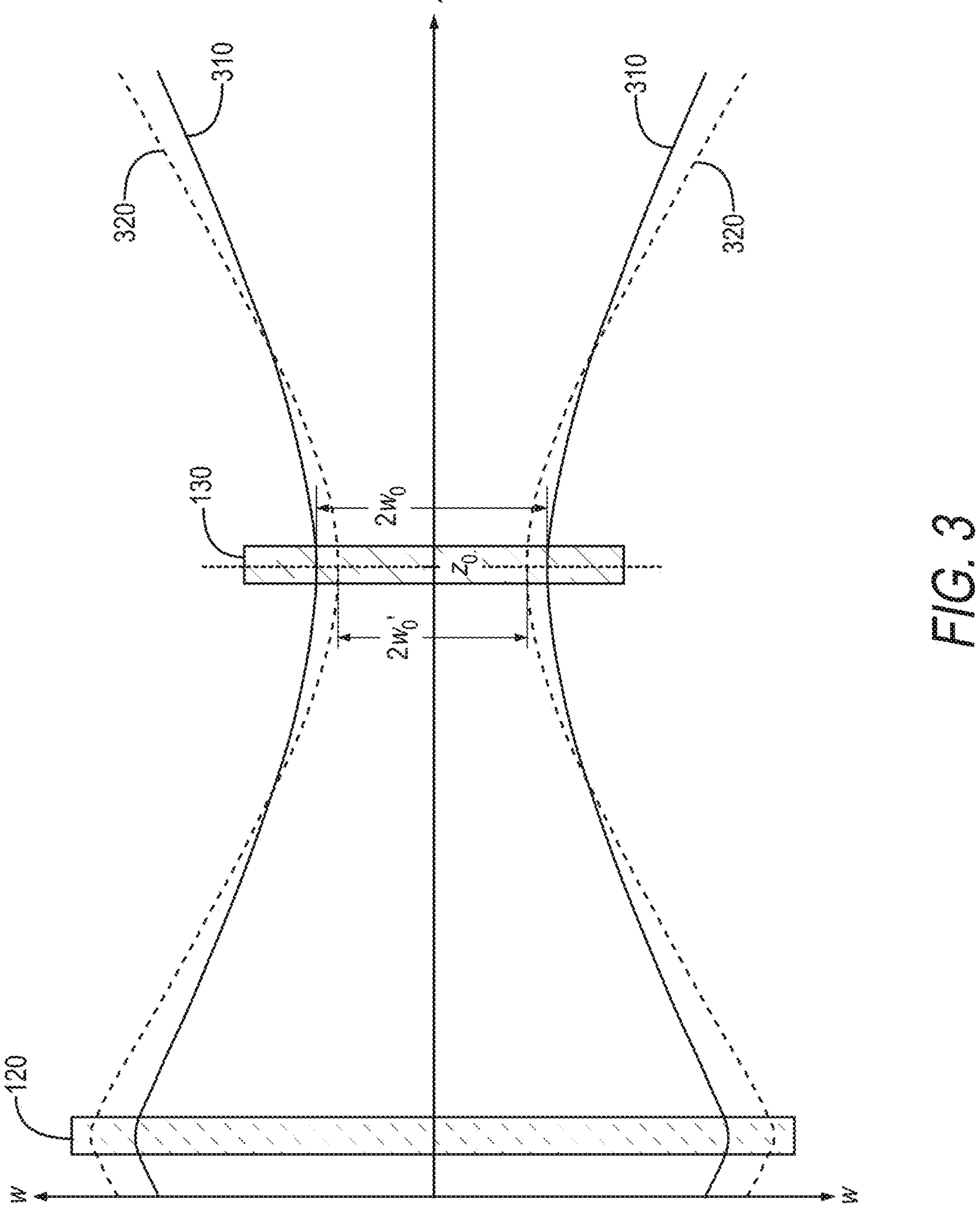
FIG. 3 illustrates the effect of thermal lensing in the gain medium on the caustic of the intracavity beam in one example of the resonator of the apparatus of FIG. 1.

FIG. 3 is a plot that illustrates the effect of thermal lensing in gain medium 120 on the caustic of intracavity beam 192 in one example of resonator 110. FIG. 3 plots the caustic of intracavity beam 192 for two different powers of the thermal lens in gain medium 120. Each caustic is shown as the $1/e^2$ beam radius w versus location z along the propagation path of intracavity beam 192 in resonator 110. At any given location z, the distance between the top and bottom curves, of the same caustic, indicates the $1/e^2$ beam diameter 2w at this location z. A thermal lens of 3.7 meters$^{-1}$ (m$^{-1}$) results in a caustic 310 characterized by a waist $w_0$. Nonlinear crystal 130 is advantageously positioned at the waist of intracavity beam 192. Increasing the thermal lens by about 8% to 4.0 m$^{-1}$ results in a caustic 320. When the thermal lens is increased, the beam diameter increases in gain medium 120 and decreases in nonlinear crystal 130. In nonlinear crystal 130, this decrease is characterized by a waist $w_0'$ that is about 20% less than waist $w_0$. The waist location $z_0$ remains the same in this example.

Consider an embodiment where apparatus 100 is configured to generate frequency-converted beam 196 as the second harmonic of intracavity beam 192. In this embodiment, the local frequency-conversion efficiency scales with the square of the intensity of intracavity beam 192. Consequently, the frequency-conversion efficiency is approximately inversely proportional to the beam radius raised to the fourth power. Applying the FIG. 3 example to this second-harmonic embodiment and assuming that nonlinear crystal 130 coincides with the waist of intracavity beam 192 (as depicted), the increase in thermal lens power from 3.7 to 4.0 m$^{-1}$ results in more than a doubling in frequency-conversion efficiency, as long as the power of intracavity beam 192 is the same (or more) for caustic 320 as for caustic 310.

In embodiments where intracavity beam 192 undergoes sum-frequency or difference-frequency mixing with beam 194, the local frequency-conversion efficiency is linearly proportional with the intensity of intracavity beam 192. However, the spatial overlap between beams 192 and 194 in nonlinear crystal 130 must be taken into account as well. It is usually optimal that both beams 192 and 194 form a waist in nonlinear crystal 130 and that these two waists are collocated and have approximately the same transverse size. Apparatus 100 may include a lens 184 that focuses beam 194 to form a waist in nonlinear crystal 130. The thermal lens in gain medium 120 affects both the intensity of intracavity beam 192 in nonlinear crystal 130 and the spatial overlap between beams 192 and 194.

The power of intracavity beam 192 depends directly on both the power of pump beam 190 and the resonator loss imposed by loss element 140. Due to the effect of thermal lensing in gain medium 120, each of the pump power and the resonator loss also indirectly affect the intensity distribution of intracavity beam 192 in nonlinear crystal 130. Even though the power and beam parameters of intracavity beam 192 are coupled through the effect of thermal lensing in gain medium 120, it turns out that the two degrees of freedom provided by the power of pump beam 190 and the resonator loss imposed by loss element 140 allow for controlling the power and beam parameters of intracavity beam 192 independently of each other.

FIGS. 4-7 further explore the relationships between resonator loss, intracavity power, thermal lensing, and intracavity beam parameters. The particular relationships shown in FIGS. 4-7 are exemplary and pertain to an embodiment of apparatus 100 where gain medium 120 is a neodymium-doped yttrium orthovanadate ($Nd^{3+}$:$YVO_4$) crystal, pump beam 190 is a continuous-wave (cw) beam with a power of 105 watts, resonator 110 implements optical diode 150 as a Faraday rotator based on a potassium terbium fluoride (KTF) crystal and a half-wave plate, and loss element 140 is a polarized output coupler in combination with a rotatable half-wave plate.

Figure 4:
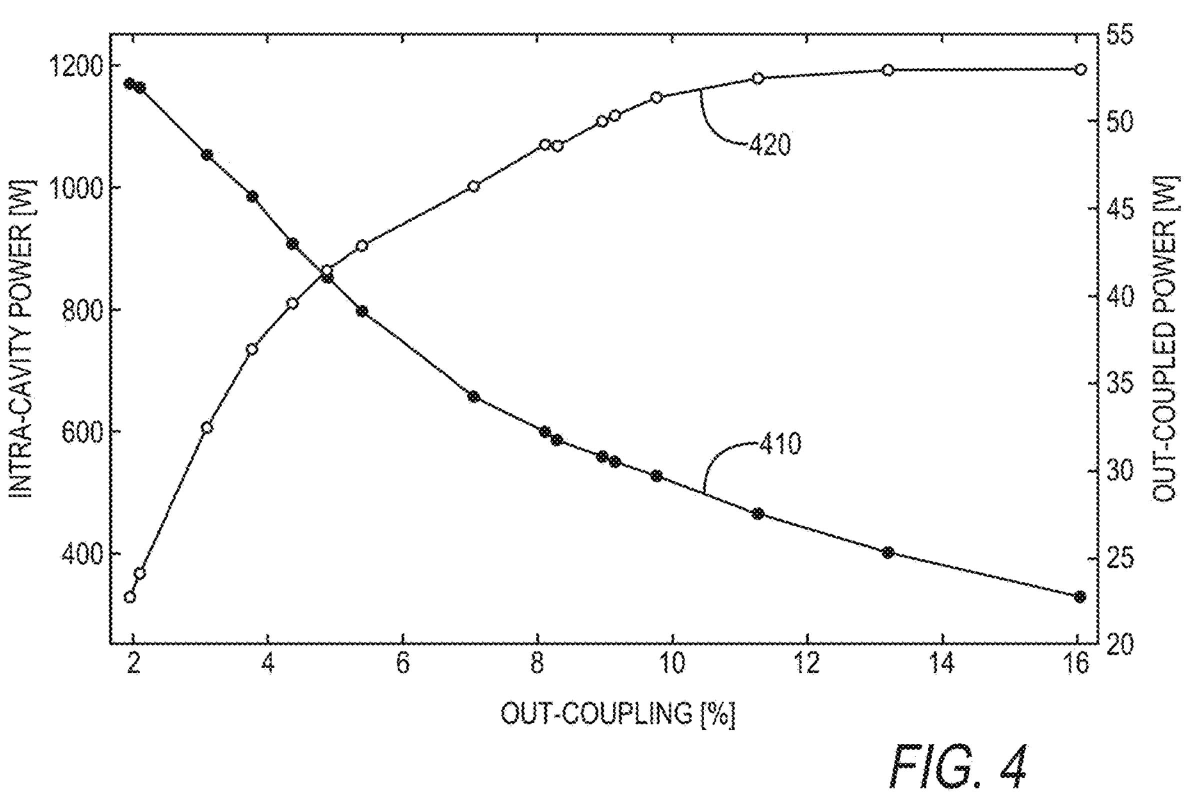
FIG. 4 illustrates the relationship between out-coupling and intracavity power, in one example of the FIG. 1 apparatus.

FIG. 4 illustrates the relationship between out-coupling and intracavity power. FIG. 4 plots a measured intracavity power 410 (solid circles) of intracavity beam 192 as a function of the out-coupling percentage. Herein, "intracavity power" refers to the power of intracavity beam 192 circulating in resonator 110. FIG. 4 also plots the out-coupled power 420 (open circles) of the out-coupled laser beam as a function of the out-coupling percentage. The out-coupling percentage represents a resonator loss. In practical implementations, other small losses will exist due to various unavoidable imperfections, such as light-leakage through cavity mirrors 112 and absorption in the Faraday rotator, and also due to frequency-conversion in nonlinear crystal 130. As the out-coupling percentage increases to couple out more laser power, the intracavity power decreases significantly. FIG. 4 is based on an experiment probing a range of out-coupling percentages from 2% to 16%. This range of out-coupling percentages result in a range of intracavity powers spanning from 1175 watts (W) down to 325 watts.

Figure 5:
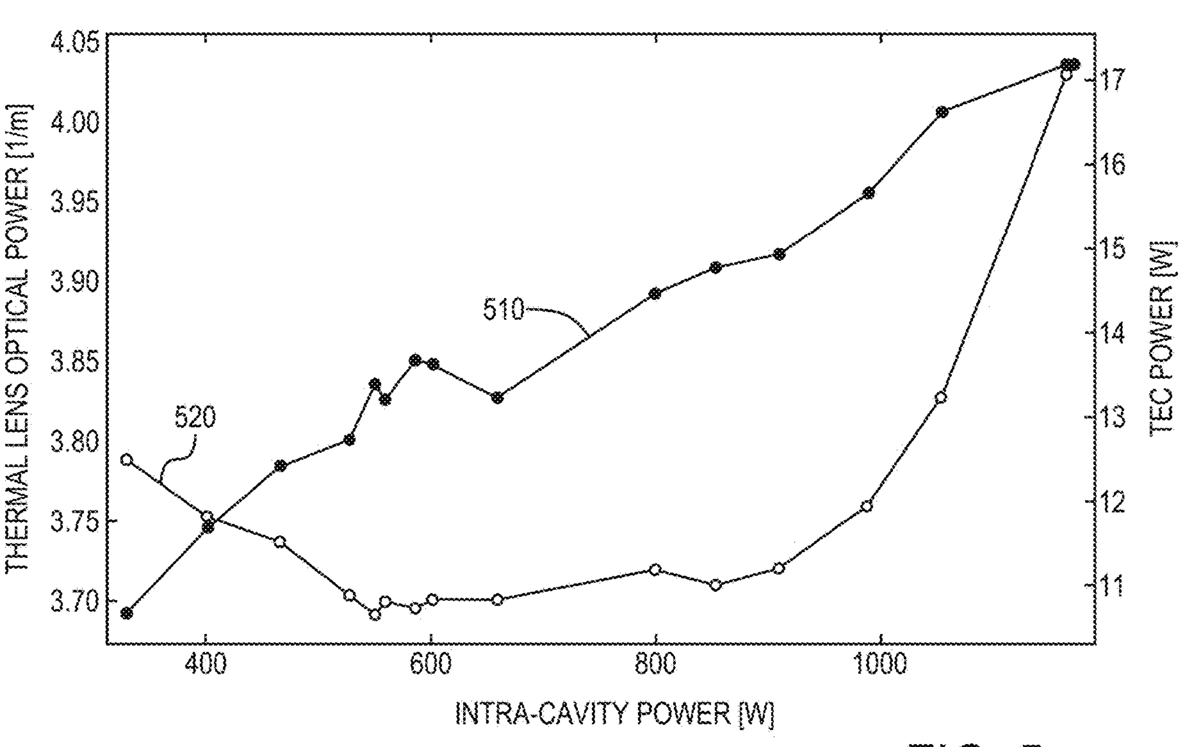
FIG. 5 illustrates the contribution from the intracavity power to thermal effects in the gain medium, in the FIG. 1 apparatus example of FIG. 4.

FIG. 5 illustrates the contribution from the intracavity power to thermal effects in gain medium 120. FIG. 5 plots a measured optical power 510 (solid circles) of the thermal lens in gain medium 120 as a function of the power of intracavity beam 192. The optical power 510 is measured by evaluating the beam parameters of a leakage beam through one of mirrors 112 and comparing the measured beam parameters to simulated beam parameters obtained for different values of optical power 510. In addition, FIG. 5 plots a measured thermal load 520 (open circles) on gain medium 120 as a function of the intracavity power. A thermo-electric cooler (TEC) heats or cools gain medium 120 as needed to maintain a constant operation temperature. The electrical power required by the TEC to maintain this constant operation temperature is used as a measure of the thermal load. FIG. 5 plots thermal lens optical power 510 and thermal load 520 for the range of intracavity powers achieved in FIG. 4.

Thermal lens optical power 510 generally increases with intracavity power. At the lowest evaluated intracavity power of 325 watts, the thermal lens has a power of about 3.7 $m^{-1}$. At the highest evaluated intracavity power of 1175 watts, the thermal lens has a power of about 4.0 $m^{-1}$. This demonstrates that the intracavity power contributes to thermal lensing in gain medium 120. At least in the present example, however, the contribution to thermal lensing from the power of intracavity beam 192 is less than the contribution from pump beam 190.

Rather than depending monotonically on the intracavity power, thermal load 520 is at a relatively stable level for intracavity powers in the range between 550 and 900 watts and then increases in both directions away from this range. This behavior indicates that intracavity beam 192 heats gain medium 120 via more than a single heating mechanism. At the higher intracavity powers, above 900 watts, the added thermal load is presumably mostly due to self-absorption of intracavity beam 192. At the lower intracavity powers, below 550 watts, the added thermal load is due to non-radiative relaxation and spontaneous emission while population inversion is high.

Figure 6:
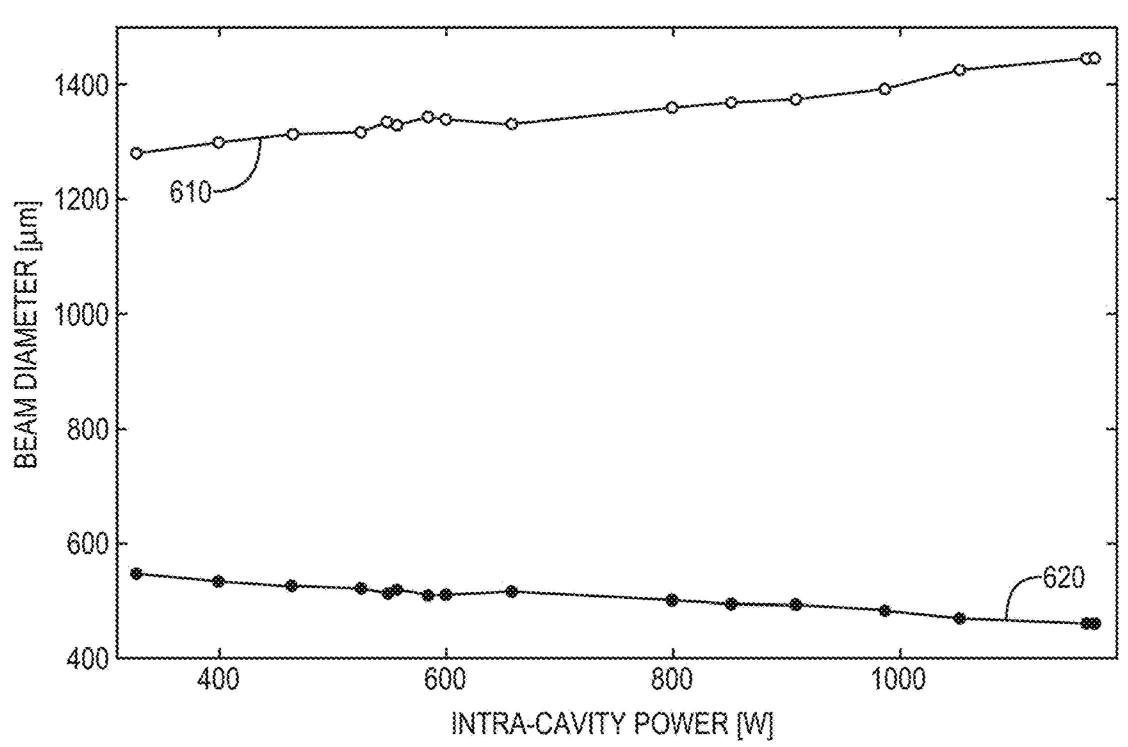
FIG. 6 demonstrates the impact of the intracavity power on the intracavity beam parameters through the effect of thermal lensing, in the FIG. 1 apparatus example of FIG. 4.

Next, FIG. 6 demonstrates the impact of the intracavity power on the intracavity beam parameters through the effect of thermal lensing. FIG. 6 plots a measured beam diameter 610 (open circles) of intracavity beam 192 in gain medium 120 and a measured beam diameter 620 (solid circles) of intracavity beam 192 at the beam waist. FIG. 6 plots beam diameters 610 and 620 as a function of intracavity power, for the range of intracavity powers achieved in FIG. 4. Beam diameter 610 in gain medium 120 increases with the intracavity power, whereas beam waist diameter 620 of intracavity beam 192 decreases.

Figure 7:
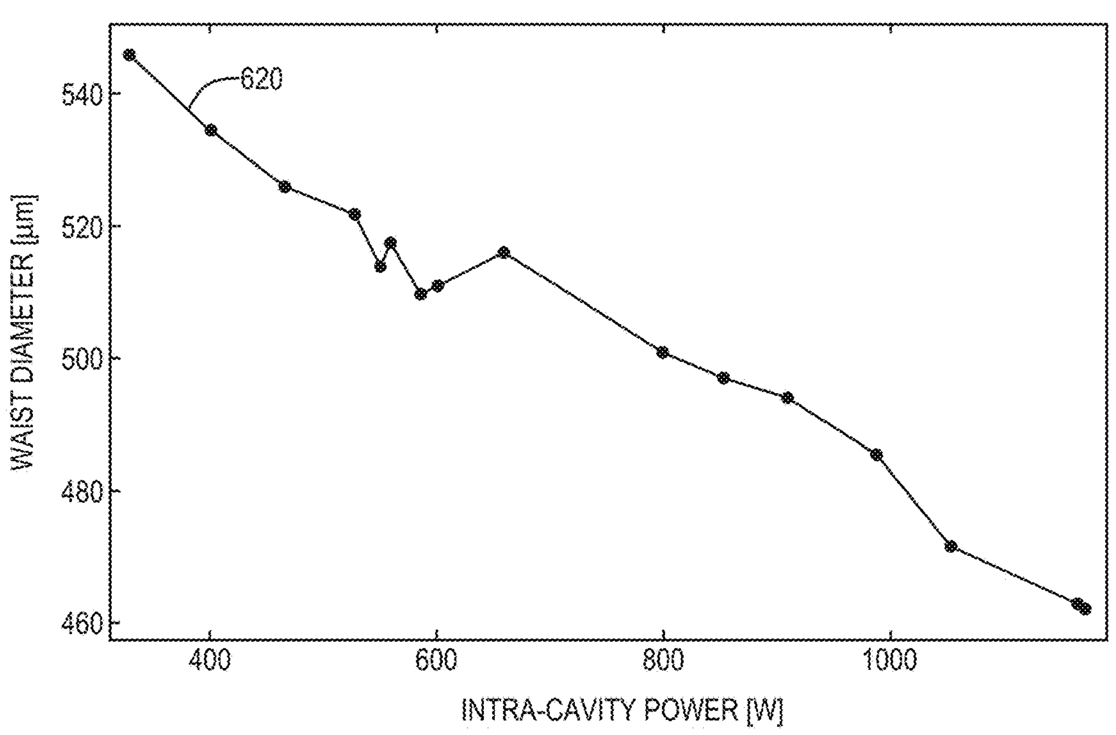
FIG. 7 is similar to FIG. 6 but zooms in on the waist diameter.

FIG. 7 zooms in on beam waist diameter 620 for improved clarity. As the intracavity power increases from 375 to 1175 watts, the waist diameter decreases from about 545 to about 460 μm, a 15% decrease.

Referring again to FIG. 3, caustics 310 and 320 are obtained from modeling of the same embodiment of apparatus 100 evaluated in FIGS. 4-7. Caustic 310 corresponds to an intracavity power of 325 watts, and caustic 320 corresponds to an intracavity power of 1175 watts.

FIGS. 3-7 demonstrate, by example, the impact of resonator loss on both the power and beam parameters of intracavity beam 192 in resonator 110. The intracavity power depends on the resonator loss and the pump power. Both the intracavity power and the pump power contribute to thermal lensing which, in turn, affects the size of intracavity beam 192 in nonlinear crystal 130. Frequency conversion in nonlinear crystal 130 is sensitive to both the power and size of intracavity beam 192 in nonlinear crystal 130. The power and beam parameters of frequency-converted beam 196 thus depend on both the pump power and the intracavity power, with the dependence on these two parameters being intercoupled. Surprisingly, the nature of these dependencies is such that it is possible to independently control the power and beam parameters of frequency-converted beam 196 over fairly wide dynamic ranges using two degrees of freedom, namely pump power and resonator loss.

Figure 8:
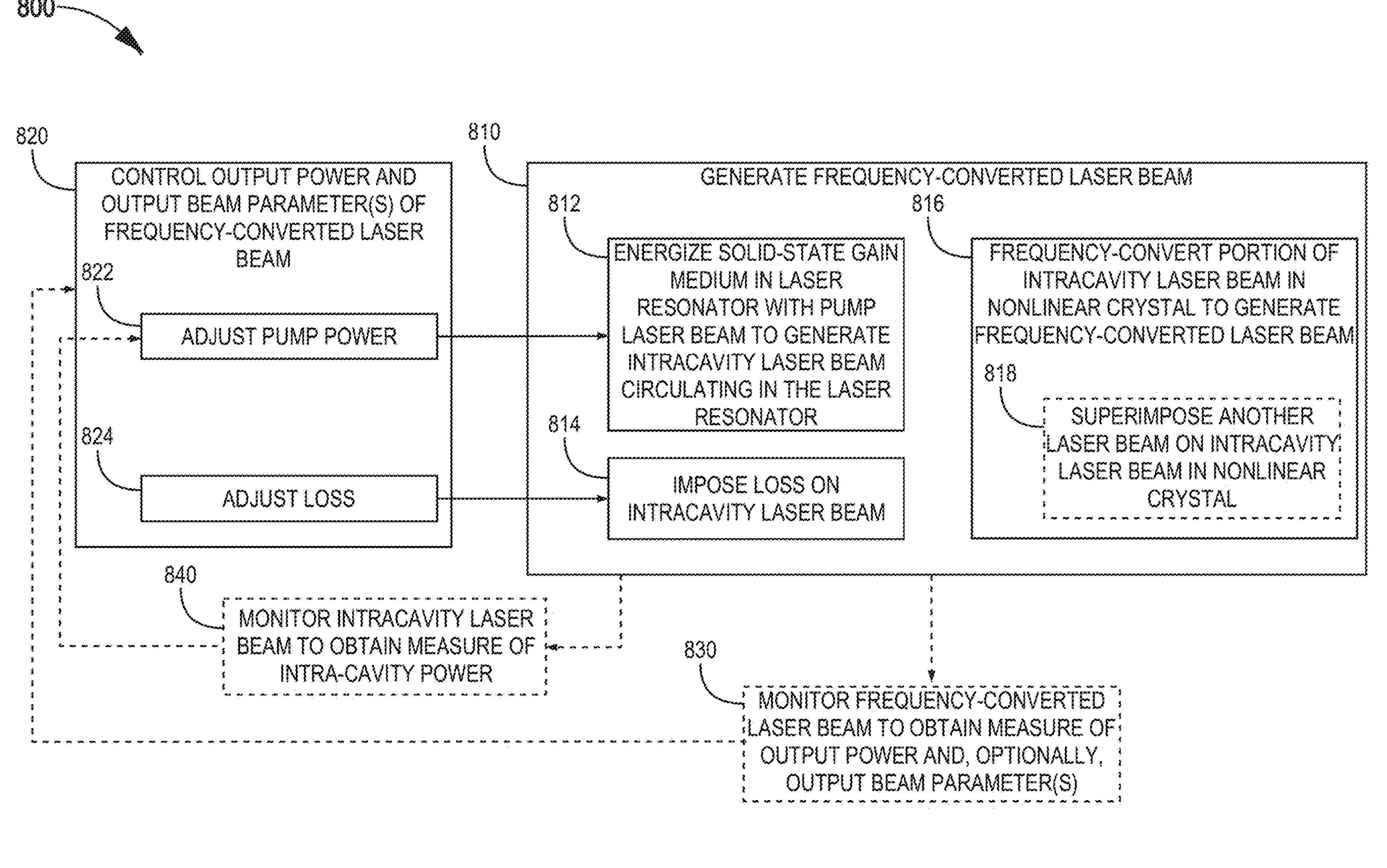
FIG. 8 is a flowchart for an intracavity frequency conversion method applicable to a solid-state laser resonator with an end-pumped gain medium, according to an embodiment.

FIG. 8 is a flowchart for one intracavity frequency conversion method 800 applicable to a solid-state laser resonator with an end-pumped gain medium. Method 800 may be performed by apparatus 100 and is discussed in this context below. Method 800 takes advantage of the complex dependence of power and beam parameters of the frequency-converted laser beam on the pump and intracavity powers to control power and beam parameters of the frequency-converted laser beam independently of each other. FIGS. 3-7 exemplify aspects of this complex dependence related to the intracavity power.

Method 800 includes steps 810 and 820. In step 810, apparatus 100 generates frequency-converted beam 196 using resonator 110 and pump laser 160. Step 820 is a control step. In step 820, controller 170 controls certain aspects of how apparatus 100 performs step 810, so as to control the power and at least one beam parameter of frequency-converted beam 196. (The power and beam parameters of frequency-converted beam 196 are also referred to as the "output power" and "output beam parameters," respectively.) The output beam parameter(s) controlled by controller 170 in step 810 may include one or more of a waist size, a waist location, a divergence, and a beam quality factor $M^2$ of frequency-converted beam 196.

Step 810 includes steps 812, 814, and 816. In step 812, pump laser 160 energizes gain medium 120 with pump beam 190, thereby generating intracavity beam 192. In step 814, loss element 140 imposes a loss on resonator 110. In step 816 nonlinear crystal 130 frequency-converts a portion of intracavity beam 192 to generate frequency-converted beam 196. In one embodiment of step 816, intracavity beam 192 undergoes harmonic generation in nonlinear crystal 130, for example second-harmonic generation. In another embodiment of step 816, intracavity beam 192 mixes with another laser beam in nonlinear crystal to generate frequency-converted beam 196 through sum-frequency or difference-frequency mixing. In this embodiment, step 816 may include a step 818 of superimposing beam 194 on intracavity beam 192 in nonlinear crystal 130. Step 818 may include the generation of beam 194 by laser 180. Step 818 may also include focusing beam 194, e.g., with lens 184, to form a waist in nonlinear crystal 130.

Step 820 includes steps 822 and 824. In step 822, controller 170 adjusts the power of pump beam 190 incident on gain medium 120 in step 812. In step 824, controller 170 adjusts the resonator loss imposed by loss element 140 in step 814. Steps 822 and 824 cooperate to control the power and beam parameter(s) of frequency-converted beam 196. By proper selection of the pump power and loss in steps 822 and 824, respectively, controller 170 is capable of adjusting the power of frequency-converted beam 196 independently of the beam parameter(s) of frequency-converted beam 196, and vice versa.

When method 800 is applied to a symmetric implementation of resonator 110, such as the resonator of FIG. 3, method 800 may adjust the waist size of intracavity beam 192 while keeping the waist location of intracavity beam 192 unchanged. Method 800 may also be applied to asymmetric implementations of resonator 110, wherein the caustic of intracavity beam 192 evolves differently in the two opposite directions away from gain medium 120. Such implementations of resonator 110 may be realized by incorporating one or more other focusing elements asymmetrically positioned with respect to gain medium 120. For asymmetric implementations of resonator 110, waist size and waist location of intracavity beam 192 are coupled to each other. Thus, method 800 may be used to adjust waist size and waist location of intracavity beam 192 in asymmetric implementation of resonator 110. In one scenario, waist location is the more critical parameter, and method 800 is used to optimize the waist location of intracavity beam 192.

The adjustments made to the pump power and loss in step 820 may be based on pre-calibrated relationships between (a) the pump power and loss and (b) the output power and beam parameter(s). Alternatively, or in combination therewith, adjustments effected by step 820 may be based at least in part on measured laser beam properties. Thus, certain embodiments of method 800 include at least one of two monitoring steps 830 and 840. Step 830 monitors frequency-converted beam 196 to obtain a measure of its power and, optionally, also one or more of its beam parameters. Step 840 monitors intracavity beam 192 to obtain a measure of the intracavity power. Step 840 may also evaluate a beam size of intracavity beam 192. In one embodiment, controller 170 adjusts the pump power and loss in step 820 based, at least in part, on a measure of the power of frequency-converted beam 196 obtained in step 830. The pump power adjustment made in step 822 may further be based on a measure of the intracavity power obtained in step 840. The adjustments made in step 820 may also be based on measures of at least one beam parameter of frequency-converted beam 196 obtained in step 830 or a beam size measurement of intracavity beam 192 obtained in step 840.

Referring again to FIG. 1, apparatus 100 may include one or more sensors 172 that interrogate frequency-converted beam 196 to obtain, in step 830 of method 800, a measure of the output power and optionally one or more output beam parameters. Sensor(s) 172 may be implemented in many different ways. Sensor(s) 172 may view or otherwise detect scattered light originating from the propagation of frequency-converted beam 196 in nonlinear crystal 130 or, as shown in FIG. 1, a beam splitter 182 may direct a small fraction of frequency-converted beam 196 toward sensor(s) 172. Beam splitter 182 may be a pick-off mirror or another type of beam splitter.

In certain embodiments, at least one sensor 172 is positioned to interrogate frequency-converted beam 196 after processing by one or more downstream optical elements (not shown in FIG. 1) outside resonator 110. For example, such a sensor 172 may interrogate an ultraviolet frequency-converted beam 196 after passing through one or more downstream optical elements subject to UV degradation. In such embodiments, method 800 may advantageously adjust the operation of resonator 110 to compensate for, e.g., noise, fluctuations, and drift caused by the downstream optical element(s).

Apparatus 100 may include a sensor (not shown in FIG. 1) that monitors intracavity beam 192 to obtain, in step 840 of method 800, a measure of the intracavity power. This sensor may conveniently be positioned in the path of a laser beam leaking out of one of cavity mirrors 112 and, for example, measure the power of such a leakage beam to obtain a measure of the intracavity power. Apparatus 100 may also include a sensor that monitors a beam size of intracavity beam 192 in step 840 of method 800.

Steps 810 and 820 may be executed together with one or both of steps 830 and 840 in an active feedback loop. In one such scenario, the active feedback loop is used to stabilize the output power, and optionally also the output beam parameter(s), in the presence of, environmental changes, UV degradation of optical elements, and/or other sources of noise, fluctuations, and drift.

Method 800 may also employ either one of steps 830 and 840 in conjunction with controller 170 utilizing pre-calibrated relationships between (a) the pump power and loss and (b) the output power and beam parameter(s). For example, controller 170 may use pre-calibrated relationships in one iteration of step 820 to set the power and beam parameter(s) of frequency-converted beam 196 to desired values, and then utilize feedback from step 830 and/or step 840 in subsequent iterations of step 820 to maintain these values of the output power and output beam parameter(s).

Embodiments of apparatus 100 generating an ultraviolet frequency-converted beam 196 are susceptible to UV damage of optical components. In particular, UV degradation of nonlinear crystal 130 is likely to occur when frequency-converted beam 196 is ultraviolet. In the cases of sum-frequency and difference-frequency mixing with an ultraviolet beam 194, beam 194 may contribute to UV degradation of nonlinear crystal 130 as well. Method 800 may be executed in an active feedback loop, involving monitoring of frequency-converted beam 196 in step 830, to compensate for gradual UV degradation of nonlinear crystal 130. If it becomes necessary to shift the location of nonlinear crystal 130 to utilize an unexposed portion of nonlinear crystal 130 for frequency conversion, controller 170 may execute step 820 to reset the output power, and optionally output beam parameter(s), after such crystal shifting. Controller 170 may perform this reset with or without utilizing feedback from steps 830 and/or 840.

Some laser processing tasks utilizing frequency-converted laser beam 196 may require changing the output power and/or output beam parameter(s). Such changes may be performed according to method 800. For example, controller 170 may execute step 820 to change the output power while keeping the output beam parameters substantially the same, or vice versa. Controller 170 may affect such changes according to pre-calibrated relationships, measurements obtained in step 830 and/or 840, or a combination thereof.

In embodiments of apparatus 100 configured for sum-frequency and difference-frequency mixing in nonlinear crystal 130, controller 170 may execute step 820 to match the size and location of a waist of intracavity beam 192 to a size and location of a waist of beam 194 in nonlinear crystal 130. Apparatus 100 and method 800 are capable of maintaining this matched waist size and waist location in the presence of various sources of noise, fluctuations, and drift. Additionally, apparatus 100 and method 800 are capable of maintaining this matched waist size and waist location while deliberately changing the output power, through suitable coordination between pump power adjustment in step 822 and loss adjustment in step 824.

Method 800 is applicable to both cw and pulsed operation of resonator 110 of apparatus 100. In pulsed embodiments, resonator 110 may further include a Q-switch, such as an AOM, an EOM, or a saturable absorber. In pulsed embodiments, pulsed operation of resonator 110 may be synchronized with pulsed operation of laser 180.

Method 800 is particularly useful in the generation of ultraviolet laser radiation. While AOMs and EOMs are reasonably affordable in the infrared and even visible spectral ranges, AOMs and EOMs for ultraviolet radiation can be cost-prohibitive and laser-induced damage thereof may limit the performance of apparatus 100. When frequency-converted beam 196 is ultraviolet, the control scheme of method 800 presents a less expensive alternative to conventional AOM- or EOM-based attenuation of the frequency-converted beam. In one related embodiment of apparatus 100, pump laser 160 and gain medium 120 are configured to generate an infrared intracavity beam 192, and nonlinear crystal 130 (or a series of nonlinear crystals 130) is configured to partly frequency convert the infrared intracavity beam 192 into an ultraviolet frequency-converted beam 196. An infrared intracavity beam 192 may mix with an ultraviolet beam 194 in nonlinear crystal 130 to generate the ultraviolet frequency-converted beam 196 through sum-frequency or difference-frequency mixing.

In an example of apparatus 100 configured for generation of ultraviolet laser radiation through mixing with beam 194, gain medium 120 is a neodymium-doped yttrium orthovanadate crystal ($Nd^{3+}:YVO_4$) or a neodymium-doped yttrium aluminum garnet ($Nd^{3+}$:YAG) crystal generating intracavity beam 192 with a wavelength of 1064 nanometers (nm), laser 180 is a frequency-quadrupled $Nd^{3+}:YVO_4$ or $Nd^{3+}$:YAG laser that generates beam 194 with a wavelength of 266 nm, and nonlinear crystal 130 is a Cesium Lithium Borate ($CsLiB_6O_{10}$) crystal wherein intracavity beam 192 undergoes sum-frequency mixing with beam 194 to generate frequency-converted beam 196 with a wavelength of 213 nm.

In an example of apparatus 100 configured for generation of ultraviolet laser radiation without use of an external laser beam, gain medium 120 is a $Nd^{3+}:YVO_4$ crystal or a $Nd^{3+}$:YAG crystal generating intracavity beam 192 with a wavelength of 1064 nm, and resonator 110 includes two nonlinear crystals 130 arranged in series. The first nonlinear crystal 130 frequency doubles a fraction of intracavity beam 192 to a wavelength of 532 nm. In the second nonlinear crystal 130, this frequency-doubled laser beam undergoes sum-frequency mixing with a remaining unconverted component of intracavity beam 192 to generate frequency-converted beam 196 with a wavelength of 355 nm.

Method 800 and apparatus 100 may impose a resonator loss through a variety of loss mechanisms, including out-coupling a fraction of intracavity beam 192 from resonator 110, absorbing a fraction of intracavity beam 192 in an absorptive medium using, for example, a moveable filter with a spatially varying transmission, and adjusting the alignment of a cavity mirror 112 or another optical element affecting the propagation path of intracavity beam 192 through resonator 110.

Figure 9:
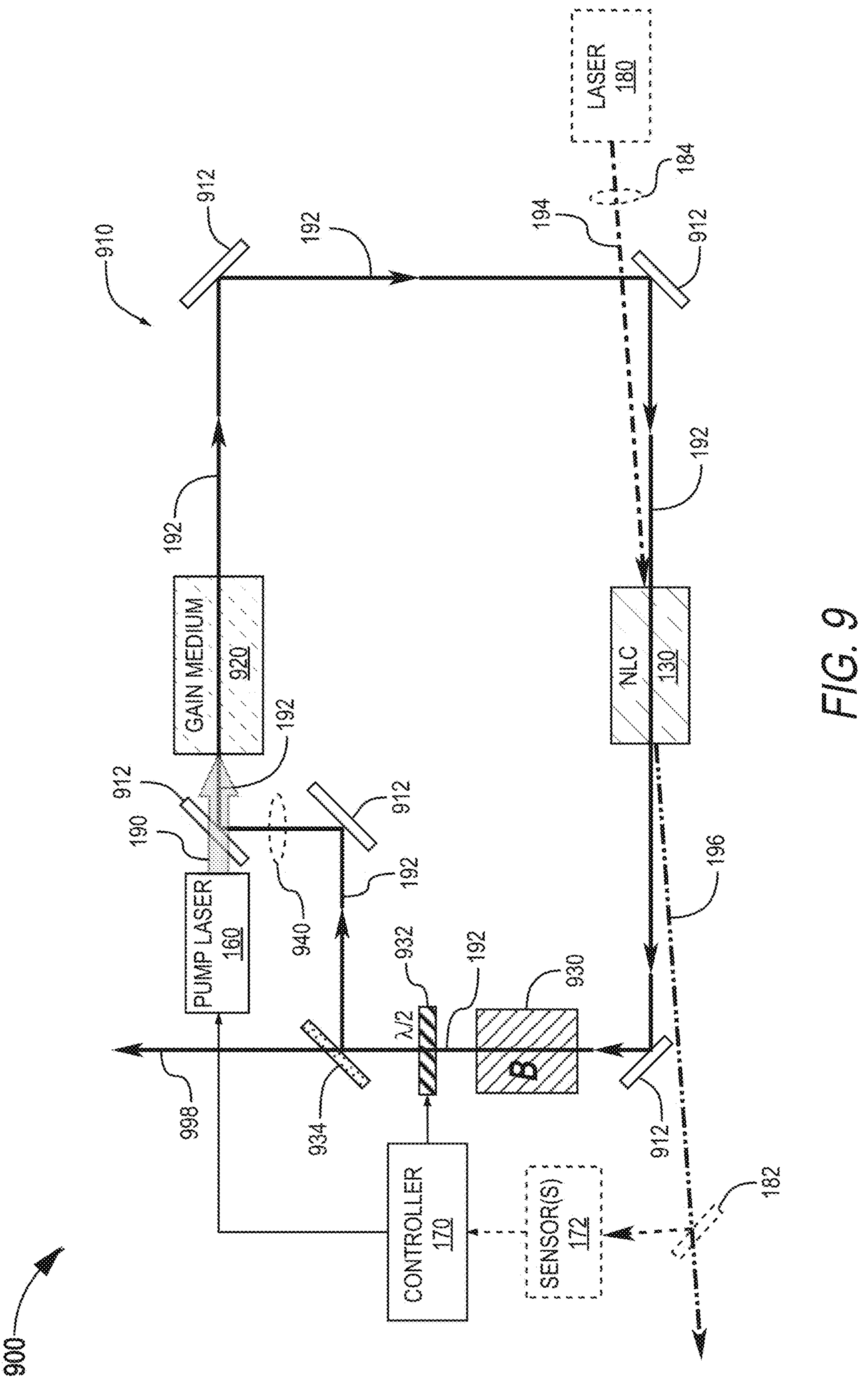
FIG. 9 illustrates a laser apparatus with intracavity frequency conversion in a solid-state laser resonator having an end-pumped, polarized solid-state gain medium, an optical diode, and a polarized output coupler, according to an embodiment.

FIG. 9 illustrates one laser apparatus 900 with intracavity frequency conversion in a solid-state laser resonator 910 having an end-pumped, polarized solid-state gain medium 920, an optical diode, and a polarized output coupler. Apparatus 900 is an embodiment of apparatus 100 and may perform method 800. Gain medium 920 favors amplification of a particular polarization component of intracavity beam 192. Gain medium 920 is, for example, a $Nd^{3+}:YVO_4$ crystal. Resonator 910 includes a Faraday rotator 930, a half-wave plate 932, and a polarized output coupler 934. Faraday rotator 930 and half-wave plate 932 together form an embodiment of optical diode 150. Half-wave plate 932 further cooperates with output coupler 934 to form an embodiment of loss element 140.

Output coupler 934 couples a polarization component of intracavity beam 192 out of resonator 910. The polarization component coupled out is orthogonal to the polarization component favored for amplification in gain medium 920. Output coupler 934 may be a polarizing beam splitter. In the example depicted in FIG. 9, output coupler 934 is a polarizing beam splitter that (a) reflects the favored polarization component of intracavity beam 192, and (b) transmits the orthogonal polarization component out of resonator 910 as an out-coupled laser beam 998. Output coupler 934 thereby functions as a cavity mirror that cooperates with a set of other cavity mirrors 912 to define the propagation path of intracavity beam 192 in resonator 910.

Half-wave plate 932 is rotatable and may be mounted on a motorized rotation mount. Controller 170 controls a polarization-rotation angle of half-wave plate 932. For example, controller 170 controls the rotation angle of the optical axis of half-wave plate 932 away from alignment with a polarization axis of gain medium 920. A minimum resonator loss is attained when controller 170 sets the polarization-rotation angle of half-wave plate 932 to exactly counteract the polarization rotation imparted by Faraday rotator 930. Controller 170 increases the resonator loss by rotating half-wave plate 932 away from the polarization-rotation angle that exactly counteracts the polarization rotation imparted by Faraday rotator 930. In this state, half-wave plate 932 only partly counteracts the polarization rotation imparted by Faraday rotator 930, and a fraction of intracavity beam 192 is therefore out-coupled by output coupler 934.

Resonator 910 (as well as other embodiments of resonator 110) may include one or more focusing or defocusing elements, e.g., a lens or one or more curved cavity mirrors, to add optical power to resonator 910 in addition to the thermal lens in the gain medium. FIG. 9 depicts one such example, wherein resonator 910 includes a focusing lens 940. As compared to embodiments of resonator 910 without lens 940, lens 940 shrinks the waist of intracavity beam 192 in nonlinear crystal 130 and shortens the overall path length of resonator 910. The smaller waist in nonlinear crystal 130 allows for a higher frequency-conversion efficiency. Lens 940 may also improve the stability of resonator 910 and extend the dynamic ranges of output powers and beam parameters over which the output powers and beam parameters may be adjusted independently of each other.

In one example of apparatus 900 performing method 800, controller 170 adjusts the polarization-rotation angle of half-wave plate 932 to achieve out-coupling percentages in the range from 0.05% to 60%. In an example of resonator 910 implementing lens 940, stable operation of resonator 910 with unidirectional propagation of intracavity beam 192 has been demonstrated for out-coupling percentages as high as 60% through output coupler 934. Utilizing both loss and pump power adjustment in apparatus 900, it is possible to achieve a wide dynamic range of either one of the power and the beam parameters of frequency-converted beam 196 while keeping the other one of the power and the beam parameters substantially constant. For example, in a sum-frequency mixing scenario, we have demonstrated a dynamic range in the power of frequency-converted beam 196 from 100% down to 10% of a maximum frequency-converted power, while maintaining substantially the same beam parameters of frequency-converted beam 196.

Figure 10:
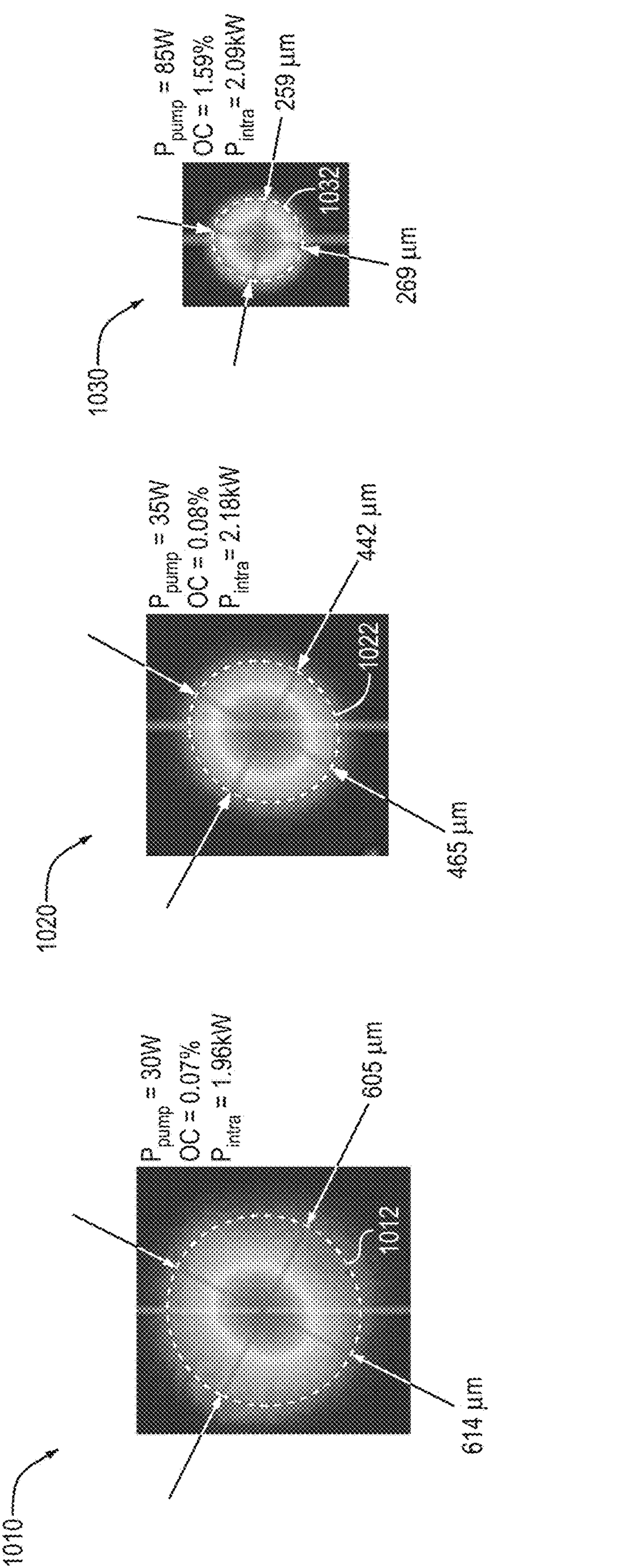
FIG. 10 illustrates simultaneous power and beam waist diameter control achieved with an example of the apparatus of FIG. 9.

FIG. 10 illustrates simultaneous power and beam waist diameter control achieved with an example of apparatus 900 implementing lens 940. In this example, gain medium 920 is a $Nd^{3+}$:$YVO_4$ crystal, pump laser 160 is a diode laser, and intracavity beam 192 has a wavelength of 1064 nm. FIG. 10 shows three cross-sectional images 1010, 1020, and 1030 of intracavity beam 192 at the waist location within nonlinear crystal 130. Images 1010, 1020, and 1030 are depicted on the same scale. Each image 1010, 1020, and 1030 was obtained by imaging a leakage beam passing through the laser cavity mirror 912 that directs intracavity beam 192 into nonlinear crystal 130. This leakage beam was imaged at a propagation distance from cavity mirror 912 equivalent to that of nonlinear crystal 130. Each image 1010, 1020, and 1030 was obtained with a different respective combination of powers of pump beam 190 and out-coupling (OC) percentages through output coupler 934.

In the case of image 1010, the pump power ($P_{pump}$) was 30 watts and the out-coupling percentage was 0.07%. This resulted in an intracavity power ($P_{intra}$) of 1.96 kilowatts (kW) and a $1/e^2$ waist 1012 of intracavity beam 192 of 614 μm×605 μm (measured along the major axis×minor axis). For image 1020, both the pump power and the out-coupling percentage were increased slightly to 35 watts and 0.08%, respectively. These relatively small changes had a significant impact on the beam waist size while the intracavity power was almost unaffected. Specifically, the waist size shrank to 465 μm×442 μm (see outline 1022), while the intracavity power made a relatively minor change to 2.18 kW. To further decrease the waist size, both pump power and out-coupling percentages were increased more substantially, resulting in image 1030. Here, the pump power was set to 85 watts and the out-coupling percentage was set to 1.59%. This resulted in a significantly reduced waist size of 269 μm×259 μm (see outline 1032), while the intracavity power again only made a minor change to 2.09 kW.

The FIG. 10 results demonstrate the capability of apparatus 900 and method 800 to control the beam waist size of intracavity beam 192 over a wide dynamic range while maintaining a substantially constant intracavity power. With adjustments made to account for the correlation between waist size and frequency-conversion efficiency in nonlinear crystal 130, this capability translates to control of beam parameters of frequency-converted beam 196 independently of its power.

Referring again to FIG. 9, half-wave plate 932 forms a part of both the optical diode and the adjustable loss element. In a modification of apparatus 900, the optical diode is implemented separately from the loss element, and half-wave plate 932 is used exclusively to control the resonator loss. Additionally, the concept of using a rotatable half-wave plate and a polarized output coupler (e.g., half-wave plate 932 and output coupler 934) may be implemented in other embodiments of resonator 110.

The out-coupling scheme based on a rotatable half-wave plate is only one example of imposing resonator loss by out-coupling a fraction of intracavity beam 192. Alternatives include incorporating an AOM or EOM in the path of intracavity beam 192 in resonator 110. While this modulator-based solution may add cost and complexity, it is a convenient scheme in Q-switched embodiments of resonator 110 that already implement an AOM or EOM for the purpose of Q-switching.

The present invention is described above in terms of a preferred embodiment and other embodiments. The invention is not limited, however, to the embodiments described and depicted herein. Rather, the invention is limited only by the claims appended hereto.

The invention claimed is:

1. A method for intracavity frequency conversion, comprising steps of:

- end-pumping a solid-state gain medium in a laser resonator with a pump laser beam, having a pump power, to generate an intracavity laser beam circulating in the laser resonator;
- imposing a loss on the intracavity laser beam, wherein the imposing step includes out-coupling a fraction of the intracavity laser beam from the laser resonator;
- frequency-converting a portion of the intracavity laser beam in a nonlinear crystal located in the laser resonator, to generate a frequency-converted laser beam having an output power; and
- adjusting the pump power and the loss to control the output power and at least one output beam parameter of the frequency-converted laser beam, the at least one output beam parameter being selected from the group consisting of beam waist size, beam waist location, beam divergence angle, and beam quality factor.

2. The method of claim 1, wherein each of the pump laser beam and the intracavity laser beam contributes to thermal lensing in the gain medium, the contribution to the thermal lensing from the pump laser beam exceeding the contribution to the thermal lensing from the intracavity laser beam.

3. The method of claim 1, wherein the frequency-converted laser beam is an ultraviolet laser beam.

4. The method of claim 3, wherein the adjusting step includes stabilizing the output power and the at least one output beam parameter in the presence of ultraviolet degradation of the nonlinear crystal.

5. The method of claim 3, further comprising shifting the nonlinear crystal transversely to a propagation direction therethrough of the intracavity laser beam, the adjusting step including resetting one or both of the output power and the at least one output beam parameter after said shifting.

6. The method of claim 1, wherein the adjusting step includes (a) changing the at least one output beam parameter while leaving the output power unchanged or (b) changing the output power while leaving the at least one output beam parameter unchanged.

7. The method of claim 1, wherein the at least one output beam parameter includes size and location of a waist of the frequency-converted laser beam.

8. The method of claim 1, further comprising monitoring the frequency-converted laser beam to obtain a measure of the output power, the adjusting step including adjusting the pump power and the loss based, at least in part, on the measure of the output power.

9. The method of claim 8, further comprising monitoring the intracavity laser beam to obtain a measure of power of the intracavity laser beam, wherein adjustment of the pump power in the adjusting step is further based on the measure of the power of the intracavity laser beam.

10. The method of claim 8, further comprising monitoring the frequency-converted laser beam to obtain a measure of the at least one output beam parameter, wherein adjustment of the pump power and the loss in the adjusting step is further based on the measure of the at least one output beam parameter.

11. The method of claim 1, wherein the frequency-converting step includes a step of superimposing a second laser beam on the intracavity laser beam in the nonlinear crystal to generate the frequency-converted laser beam from mixing of the intracavity laser beam with the second laser beam.

12. The method of claim 11, wherein:

the superimposing step includes focusing the second laser beam to a waist in the nonlinear crystal; and the adjusting step includes matching size and location of a waist of the intracavity laser beam to size and location of a waist of the second laser beam.

13. The method of claim 11, wherein at least one of the second laser beam and the frequency-converted laser beam is ultraviolet.

14. The method of claim 1, further comprising optically selecting a polarization component of the intracavity laser beam for amplification in the gain medium, the imposing step including a step of rotating polarization of the intracavity laser beam away from the selected polarization component, the out-coupled fraction being a polarization component that is orthogonal to the selected polarization component.

15. The method of claim 14, further comprising restricting propagation of the intracavity laser beam in the laser resonator to unidirectional circulation using an optical diode.

16. The method of claim 15, the optical diode including a Faraday rotator and a half-wave plate, the rotating step including setting the half-wave plate to only partly counteract polarization rotation by the Faraday rotator in each pass of the intracavity laser beam through the optical diode.

17. The method of claim 1, wherein the imposing step uses an acousto-optic or electro-optic modulator to out-couple the fraction.

18. A laser apparatus with intracavity frequency conversion, comprising:

a laser resonator including:

a solid-state gain medium, a nonlinear crystal, and an adjustable loss element arranged to impose an adjustable loss on the laser resonator, wherein imposing the adjustable loss on the laser resonator includes out-coupling a fraction of an intracavity laser beam from the laser resonator;

a pump laser for generating a pump laser beam having a pump power and arranged to end-pump the gain medium so as to generate an intracavity laser beam circulating in the laser resonator and undergoing partial frequency-conversion in the nonlinear crystal to generate a frequency-converted laser beam having an output power;

one or more sensors for monitoring the output power and at least one output beam parameter of the frequency-converted laser beam, the at least one output beam parameter being selected from the group consisting of beam waist size, beam waist location, beam divergence angle, and beam quality factor; and a controller configured to control the output power and the at least one output beam parameter by adjusting the pump power and the loss according to monitored values of the output power and the at least one output beam parameter.

19. The laser apparatus of claim 18, further comprising a second laser for delivering a second laser beam to the nonlinear crystal to mix with the intracavity laser beam so as to generate the frequency-converted laser beam.

* * * * *